United States Patent
Larsen et al.

(10) Patent No.: US 12,359,596 B2
(45) Date of Patent: Jul. 15, 2025

(54) RETENTION APPARATUS FOR WIRE MESH ARRANGEMENT

(71) Applicant: Donaldson Company, Inc., Bloomington, MN (US)

(72) Inventors: Derek M. Larsen, Mound, MN (US); Todd R. Taubert, St. Paul, MN (US); Nathaniel I. Iverson, Hopkins, MN (US); William J. Baird, Prior Lake, MN (US); Mark T. Brandl, Ham Lake, MN (US); David D. Rowley, Minnetonka, MN (US)

(73) Assignee: Donaldson Company, Inc., Bloomington, MN (US)

( * ) Notice: Subject to any disclaimer, the term of this patent is extended or adjusted under 35 U.S.C. 154(b) by 648 days.

(21) Appl. No.: 17/610,355

(22) PCT Filed: May 8, 2020

(86) PCT No.: PCT/US2020/032079
§ 371 (c)(1),
(2) Date: Nov. 10, 2021

(87) PCT Pub. No.: WO2020/231801
PCT Pub. Date: Nov. 19, 2020

(65) Prior Publication Data
US 2022/0235687 A1    Jul. 28, 2022

Related U.S. Application Data

(60) Provisional application No. 62/846,197, filed on May 10, 2019.

(51) Int. Cl.
| | |
|---|---|
| *F01N 3/20* | (2006.01) |
| *B01D 53/94* | (2006.01) |
| *F01N 3/28* | (2006.01) |

(52) U.S. Cl.
CPC .......... *F01N 3/2066* (2013.01); *B01D 53/94* (2013.01); *F01N 3/2803* (2013.01); *F01N 3/2892* (2013.01); *F01N 2610/1453* (2013.01)

(58) Field of Classification Search
CPC .... F01N 3/2066; F01N 3/2803; F01N 3/2892; F01N 2610/1453; F01N 13/009;
(Continued)

(56) References Cited

U.S. PATENT DOCUMENTS

| | | |
|---|---|---|
| 4,046,063 A | 9/1977 | Berger |
| 4,329,162 A | 5/1982 | Pitcher, Jr. |

(Continued)

FOREIGN PATENT DOCUMENTS

| | | | |
|---|---|---|---|
| DE | 3203237 A1 | * | 8/1983 |
| WO | 2009/085641 A1 | | 7/2009 |

(Continued)

OTHER PUBLICATIONS

International Search Report and Written Opinion for PCT/US2020/032079 (Jun. 29, 2020).

*Primary Examiner* — Matthew T Largi
(74) *Attorney, Agent, or Firm* — Merchant & Gould P.C.

(57) ABSTRACT

An exhaust treatment device includes a dosing and mixing assembly having a wire mesh puck. A retaining arrangement holds the mesh puck and maintains the mesh puck in an axially compressed state. The compressive force may be sufficient to inhibit rotation of the wire mesh. A peripheral side of the wire mesh is allowed to float while edges of the axial ends are trapped between at least two stop members of the retaining arrangement.

23 Claims, 12 Drawing Sheets

(58) Field of Classification Search
CPC ............ F01N 2240/20; F01N 2610/02; F01N 2610/14; B01D 53/94
See application file for complete search history.

(56) References Cited

U.S. PATENT DOCUMENTS

| | | | |
|---|---|---|---|
| 4,426,761 A * | 1/1984 | Sassak | F16L 13/16 403/278 |
| 4,947,957 A | 8/1990 | Cullen et al. | |
| 5,656,048 A | 8/1997 | Smith et al. | |
| 6,213,118 B1 * | 4/2001 | Adcock | F23J 15/00 126/307 R |
| 6,245,301 B1 | 6/2001 | Stroom et al. | |
| 6,922,893 B2 | 8/2005 | Ingram | |
| 7,144,448 B2 | 12/2006 | Garner et al. | |
| 7,981,176 B2 | 7/2011 | Rinaldi et al. | |
| 2002/0141910 A1 | 10/2002 | Adiletta | |
| 2004/0219076 A1 | 11/2004 | Zettel et al. | |
| 2006/0228273 A1 * | 10/2006 | Maloney | F01N 3/2853 422/177 |
| 2009/0071134 A1 | 3/2009 | Lattin | |
| 2010/0005790 A1 * | 1/2010 | Zhang | F01N 3/36 60/324 |
| 2010/0282667 A1 | 11/2010 | Sakraschinsky et al. | |
| 2011/0006136 A1 | 1/2011 | Flynn et al. | |
| 2011/0146254 A1 | 6/2011 | Yi et al. | |
| 2015/0218996 A1 * | 8/2015 | Brandl | F01N 3/2066 60/295 |
| 2016/0076425 A1 | 3/2016 | Goffe | |
| 2016/0312679 A1 * | 10/2016 | Schellin | F01N 3/2066 |
| 2016/0361694 A1 * | 12/2016 | Brandl | B01F 25/103 |
| 2017/0128884 A1 | 5/2017 | Goffe | |
| 2017/0342886 A1 * | 11/2017 | Gavin | F01N 3/2066 |

FOREIGN PATENT DOCUMENTS

| | | |
|---|---|---|
| WO | 2016/118720 A1 | 7/2016 |
| WO | 2021/007069 A1 | 1/2021 |

* cited by examiner

RETENTION APPARATUS FOR WIRE MESH ARRANGEMENT

This application is a US National Stage application of PCT International Patent application No. PCT/US2020/032079, filed May 8, 2020, which claims the benefit of priority to U.S. Provisional patent application Ser. No. 62/846,197, filed May 10, 2019, which applications are incorporated herein by reference. To the extent appropriate, a claim of priority is made to each of the above disclosed applications.

BACKGROUND

Vehicles equipped with diesel engines typically include exhaust systems that have aftertreatment systems such as selective catalytic reduction catalyst devices, lean NOx catalyst devices, or lean NOx trap devices to reduce the amount of undesirable gases, such as nitrogen oxides (NOx) from the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. However, the efficiency of the aftertreatment system depends upon how evenly the reactants are mixed with the exhaust gases. Therefore, there is a need for a flow device that provides a uniform mixture of exhaust gases and reactants.

A wire mesh puck can be disposed opposite or second of the doser to aid in dispersing the reactant within the exhaust flow. The wire mesh puck is spot welded and brazed into a mantle (i.e., a surrounding support ring). Accordingly, the peripheral side of the wire mesh puck is mechanically attached to the mantle at one or more points. The mantle is then attached within a conduit (e.g., by welding). Improvements are desired.

SUMMARY

Some aspects of the disclosure are directed to a retention assembly and method for a wire mesh puck for use with an exhaust after treatment device. The wire mesh puck is axially retained within a conduit by a retaining arrangement. The retaining arrangement supports the mesh puck about a peripheral area of the end faces of the mesh puck. A peripheral side of the wire mesh puck is allowed to float relative to an interior surface of the conduit. Advantageously, allowing the peripheral side of the mesh puck to float may reduce the stress applied to the mesh puck under vibrating conditions.

In certain implementations, the wire mesh puck is axially retained while in an axially compressed state (i.e., is under axial compression). In some examples, the axial compression is sufficient to inhibit rotation of the wire mesh puck. In other examples, a secondary mechanism can be used to inhibit rotation of the mesh puck. For example, one or more dimples may inhibit rotation by extending into the peripheral edge of the mesh puck without being affixed to the peripheral edge.

In some implementations, the mesh puck is mantle-less. In such examples, the retention arrangement is formed by one or more components of the exhaust aftertreatment device. Removing the mantle may reduce the cost of the system by reducing the number of parts therein and/or by eliminating the labor to attach the puck to the mantle. In other implementations, a mantle defines the conduit and carries the mesh puck within the conduit. The mantle can be mechanically coupled to one or more components of the exhaust aftertreatment device.

In certain implementations, the retaining arrangement includes at least a first stop member and a second stop member. In certain examples, the retaining arrangement includes a plurality of first stop members. In certain examples, the retaining arrangement includes a plurality of second stop members. In some examples, the first stop member is integral with the conduit (e.g., is formed by beading, dimpling, tapering, and/or crimping the conduit). In other examples, the first stop member is a separate piece that is mechanically coupled (e.g., welded, riveted, fastened, adhesively affixed, etc.) within the conduit.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
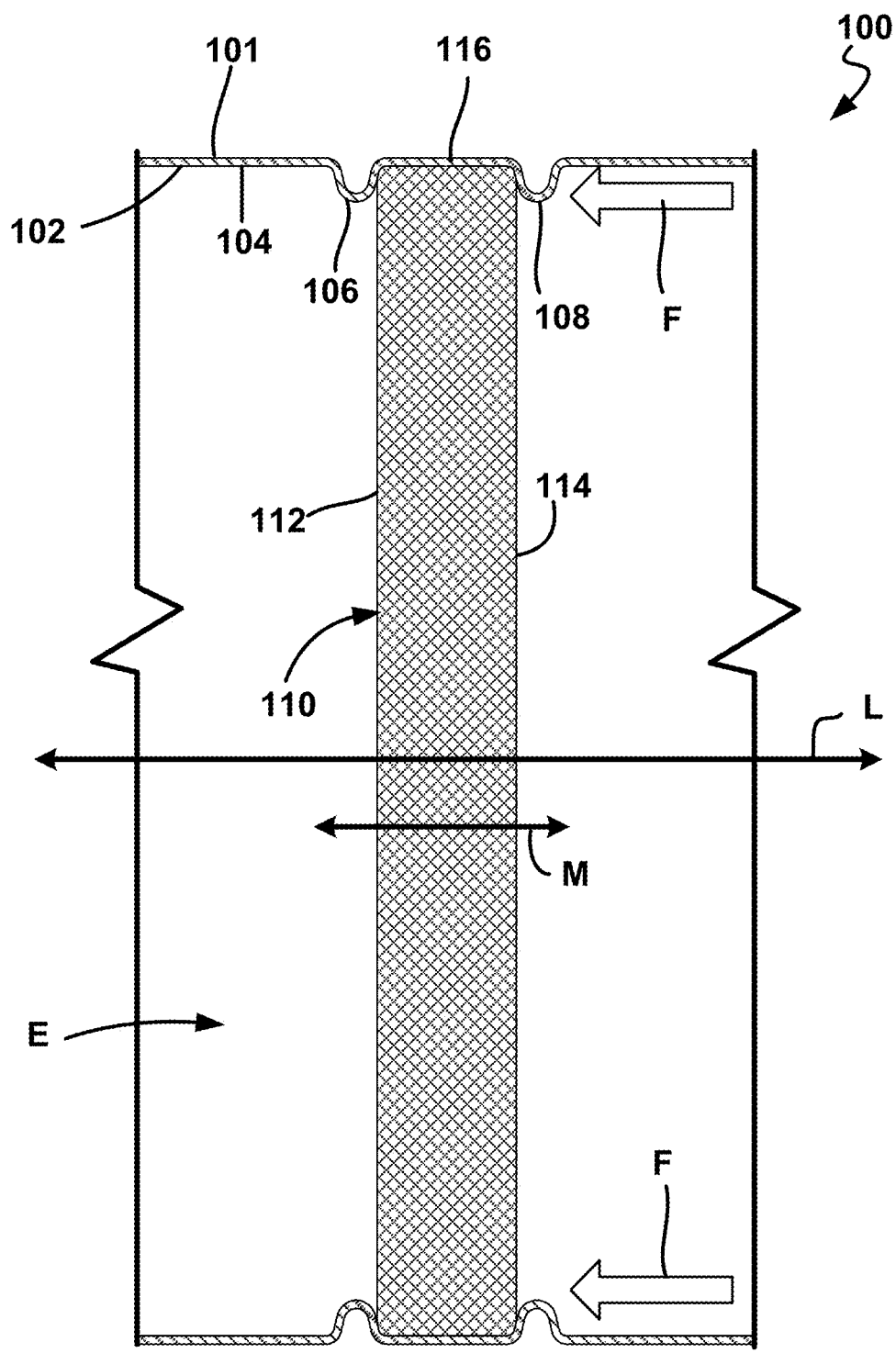
FIG. 1 is a cross-sectional view of a first example retention arrangement holding a mesh puck within a conduit.

Reference will now be made in detail to exemplary aspects of the present disclosure that are illustrated in the accompanying drawings. Wherever possible, the same reference numbers will be used throughout the drawings to refer to the same or like parts.

The present disclosure is directed to an exhaust treatment device coupled to an exhaust pipe. The exhaust treatment device including a mesh puck held by a retention arrangement. The mesh puck includes opposite first and second axial ends separated by a peripheral side. The retention arrangement maintains the mesh puck in an axially compressed state while allowing the peripheral side of the mesh puck to float relative to the interiorly facing surface of a surrounding conduit. As the term is used herein, the peripheral side "floats" when the portions of the wires forming the peripheral side are not mechanically connected to the opposing surface of a surrounding conduit. In some examples, the retention arrangement applies an axial compression force on portions of the end faces of the mesh puck. In other examples, the axial compression force is applied separate from the retention arrangement.

In some examples, the mesh puck is a mantle-less mesh puck. In such examples, the retention arrangement is disposed within an exhaust flow conduit of the exhaust treatment device without an intervening structure (see FIGS. 1-6). In other examples, the mesh puck has a mantle. In such examples, the mantle defines the conduit in which the retention arrangement is disposed. The mantle would define the retention arrangement to axially compress the mesh puck 110 while allowing the peripheral edge to float relative to the mantle. The mantle could then be mechanically connected (e.g., welded) within an exhaust flow conduit of the exhaust treatment device.

Referring to the figures in general, example retention arrangements 100, 120, 130, 140, 150, 160, 230, 260 for axially retaining a mesh puck 110 within a conduit 102, 122, 132, 142, 212, 220 through which exhaust flows (see arrow E) are shown. The retention arrangement 100, 120, 130, 140, 150, 160, 230, 260 includes first and second stop members 106, 156, 226, 270, 108, 128, 138, 148, 168, 178, 188, 264. The mesh puck 110 is trapped between the first stop member 106, 156, 226, 270 and the second stop member 108, 128, 138, 148, 168, 178, 188, 264 to inhibit axial movement of the mesh puck 110 along a longitudinal axis L of the conduit 102. In some implementations, the first stop member 106, 226, 270 is disposed upstream of the mesh puck 110 and the second stop member 108, 128, 138, 148, 168, 178, 188, 264 is disposed downstream of the mesh puck 110. In other implementations, the first stop member 106, 226, 270 is disposed downstream of the mesh puck 110 and the second stop member 108, 128, 138, 148, 168, 178, 188, 264 is disposed upstream of the mesh puck 110.

Figure 7:
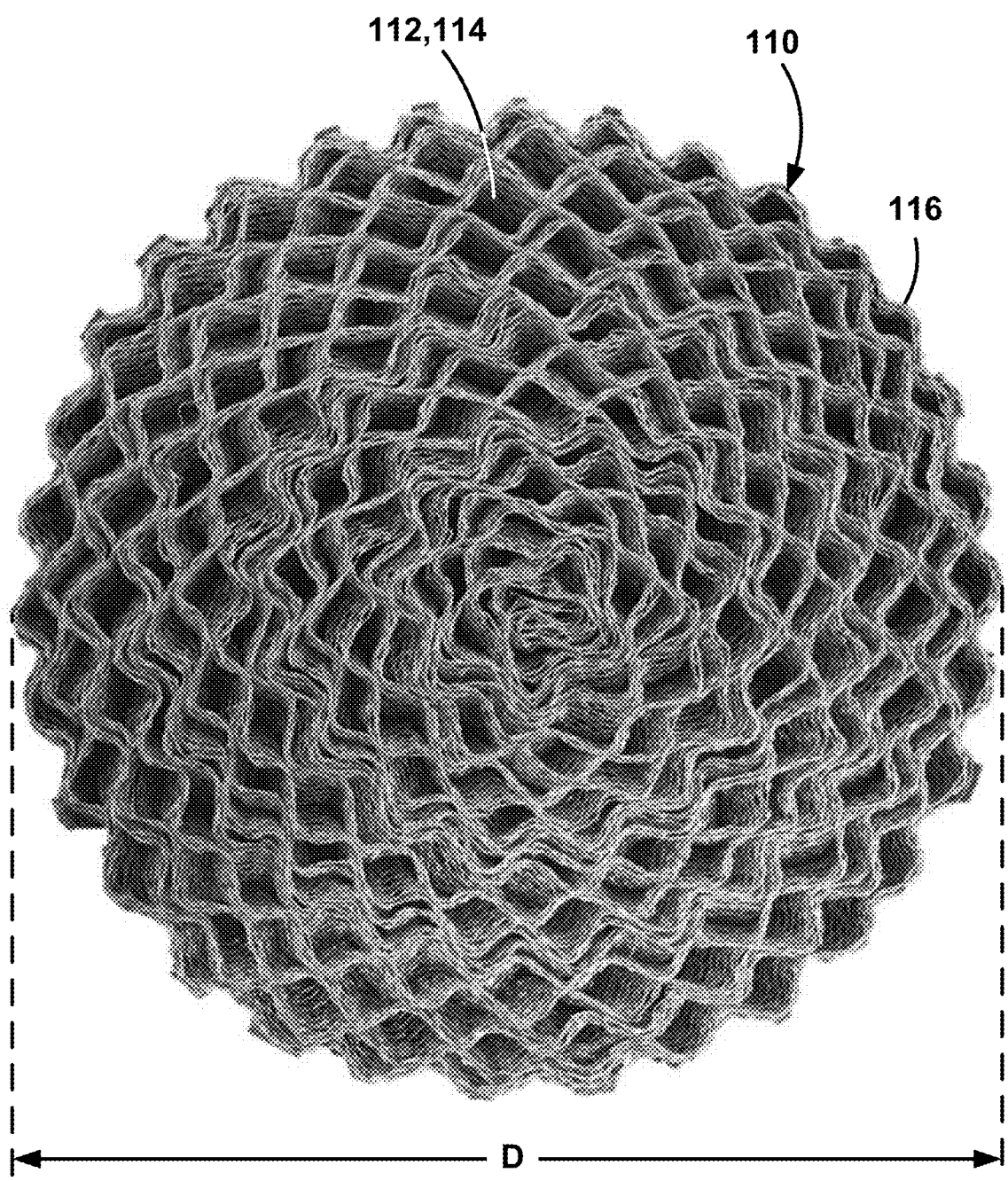
FIG. 7 is a front elevational view of an example mesh puck suitable for use with any of the retention arrangements disclosed herein.

As shown in FIG. 7, the mesh puck 110 has a first axial end face 112, an opposite second axial end face 114, and an outwardly-facing periphery 116 extending between the first and second faces 112, 114. The mesh puck 110 has a cross-dimension (e.g., diameter if the puck is circular) D extending parallel with the faces 112, 114 and a thickness extending along a mesh axis M between the first and second axial end faces 112, 114. In certain examples, the mesh puck 110 is formed from a knit tube of wires, which is flattened, crimped, rolled into a puck, cleaned, and brazed.

In certain implementations, the mesh puck 110 is resilient at least along the mesh axis M. In certain examples, the mesh puck 110 is installed within the conduit 102, 122, 132, 142, 212, 220 in an axially compressed state. In some examples, the mesh puck 110 is axially compressed by the first and second stop members. In other examples, the compression force is separately applied to the mesh puck 110 and the first and second stop members inhibit the mesh puck 110 from returning to an uncompressed state.

In certain implementations, the mesh puck 110 is axially compressed by an axial compression distance of at least 0.01 inches when in the axially compressed state compared to an uncompressed state. In certain implementations, the axial compression distance is at least 0.02 inches. In certain implementations, the axial compression distance is at least 0.03 inches. In certain implementations, the axial compression distance is at least 0.04 inches. In certain implementations, the axial compression distance is at least 0.05 inches. In certain implementations, the axial compression distance is at least 0.06 inches. In certain implementations, the axial compression distance is at least 0.07 inches. In certain implementations, the axial compression distance is at least 0.08 inches. In certain implementations, the axial compression distance is at least 0.09 inches. In certain implementations, the axial compression distance is at least 0.1 inches.

In certain implementations, the compression force is applied to opposite first and second axial end faces 112, 114 of the mesh puck 110. In certain examples, the mesh puck 110 is axially compressed using at least 1 pound-force. In certain examples, the mesh puck 110 is axially compressed using at least 5 pound-force. In certain examples, the mesh puck 110 is axially compressed using at least 20 pound-force. In certain examples, the mesh puck 110 is axially compressed using at least 50 pound-force. In certain examples, the mesh puck 110 is axially compressed using at least 80 pound-force. In certain examples, the mesh puck 110 is axially compressed using at least 100 pound-force.

In certain implementations, the retention arrangement 100, 120, 130, 140, 150, 160, 230, 260 applies or maintains a compression force of at least 50 pound-force to the mesh puck 110. In certain implementations, the retention arrangement 100, 120, 130, 140, 150, 160, 230, 260 applies or maintains a compression force of between about 75 pound-force and 125 pound-force to the mesh puck 110. In certain implementations, the retention arrangement 100, 120, 130, 140, 150, 160, 230, 260 applies or maintains a compression force of between about 85 pound-force and 100 pound-force to the mesh puck 110. In certain examples, the retention arrangement 100, 120, 130, 140, 150, 160, 230, 260 applies or maintains a compression force of about 85 pound-force. In certain examples, the retention arrangement 100, 120, 130, 140, 150, 160, 230, 260 applies or maintains a compression force of about 90 pound-force. In certain examples, the retention arrangement 100, 120, 130, 140, 150, 160, 230, 260 applies or maintains a compression force of about 95 pound-force. In certain examples, the retention arrangement 100, 120, 130, 140, 150, 160, 230, 260 applies or maintains a compression force of about 100 pound-force.

In some implementations, the outwardly-facing periphery 116 of the mesh puck 110 does not contact the interiorly facing surface 104 of the conduit 102, 122, 132, 142, 212, 220. In other implementations, the interiorly facing surface 104 applies radial pressure on the periphery 116 of the mesh puck 110. In certain implementations, the periphery 116 is allowed to float relative to the interiorly facing surface 104 of the conduit 102, 122, 132, 142, 212, 220. As the term is used herein, the periphery "floats" when no portion of the outwardly-facing periphery 116 is mechanically attached (e.g., welded, glued, brazed, etc.) to the interiorly facing surface 104.

In certain implementations, the first and second stop members 106, 226, 270, 108, 128, 138, 148, 178, 188, 264 extend across only a portion of the end faces 112, 114. In certain implementations, a majority of the surface area of the end faces 112, 114 remains exposed to exhaust flow when the mesh puck 110 is being axially compressed by the first and second stop members 106, 226, 270, 108, 128, 138, 148, 168, 178, 188, 264. In certain implementations, the first and second stop members 106, 226, 270, 108, 128, 138, 148, 178, 188, 264 extend over only an outermost periphery of the end faces 112, 114.

In some implementations, each of the first and second stop members 106, 226, 270, 108, 128, 138, 148, 168, 178, 188, 264 can form a continuous support ring around a circumference of the interiorly facing surface 104 of the conduit 102, 122, 132, 142, 212, 220. In various examples, the continuous support ring can include a separate ring sized to be fitted within the conduit 102, 122, 132, 142, 212, 220, an integral ring extending into the conduit 102, 122, 132, 142, 212, 220 from the interiorly facing surface 104, or a crimped, beaded, or dimpled portion of the interiorly facing surface 104 of the conduit 102, 122, 132, 142, 212, 220. In other implementations, each of the first and second stop members 106, 226, 270, 108, 128, 138, 148, 168, 178, 188, 264 can form an interrupted support ring around the circumference of the interiorly facing surface 104 of the conduit 102, 122, 132, 142, 212, 220. In various examples, the interrupted support ring can include a circumferential pattern of welded beads protruding into the conduit 102, 122, 132, 142, 212, 220, a series of circumferentially spaced dimpled portion, cut portions, beaded portions, or crimped portions of the conduit 102, 122, 132, 142, 212, 220, or a series of separate pieces circumferentially mounted within the conduit 102, 122, 132, 142, 212, 220. In still other implementations, the first and second stop members 106, 226, 270, 108, 128, 138, 148, 168, 178, 188, 264 each include a single protrusion (e.g., bead, dimple, crimp, cut-out, etc.). In yet other implementations, the first and second stop members 106, 226, 270, 108, 128, 138, 148, 168, 178, 188, 264 each include one or more rods or beams extending across the conduit 102, 122, 132, 142, 212, 220.

As shown in FIGS. 1-11, the mesh puck 110 can be installed and compressed within the conduit 102, 122, 132, 142, 212, 220 in a variety of ways.

FIG. 1 shows a first example retention arrangement 100 for holding a mesh puck 110 within the conduit 102 defined by a pipe 101. The mesh puck 110 is installed with the first face 112 abutting a first stop member 106 within the conduit 102. In some implementations, the first stop member 106 is integrally formed with the conduit 102. In other implementations, the first stop member 106 is separate from the conduit, but pre-installed (e.g., welded, glued, etc.) within the conduit 102 prior to installing the mesh puck 110. The second stop member 108 is a separate piece from the conduit 102. The second stop member 108 is slid or otherwise moved within the conduit 102 towards the mesh puck 110. The second stop member 108 continues to be pressed or otherwise moved towards the mesh puck 110 until a predetermined compression force F is applied to the mesh puck 110 along the mesh axis M. For example, the mesh puck 110 is axially compressed between the first and second stop members 106, 108. Then, the second stop member 108 is affixed (e.g., welded, glued, snap-fit, etc.) to the conduit 102 at a position where the second stop member 108 applies the loading force F to the mesh puck 110.

In some implementations, the mesh puck 110 is mantleless and held within the conduit 102 of the pipe 101, which may form part of an exhaust system. As indicated by the break lines in FIG. 1, the pipe 101 may extend beyond what is shown. In other implementations, the pipe 101 functions as a mantle for the mesh puck 110, thereby forming a self-contained unit that can be mounted within the conduit of another pipe or other exhaust system component. In such implementations, the peripheral side of the mesh puck 110 still floats relative to the interiorly facing surface 104 of the pipe 101. In some such examples, one or both sides of the pipe 101 may extend away from the first and second stop members 106, 108 to form a mounting surface for the mantle. In other such examples, the pipe 101 may terminate shortly beyond the first and second stop members 106, 108.

Figure 2:
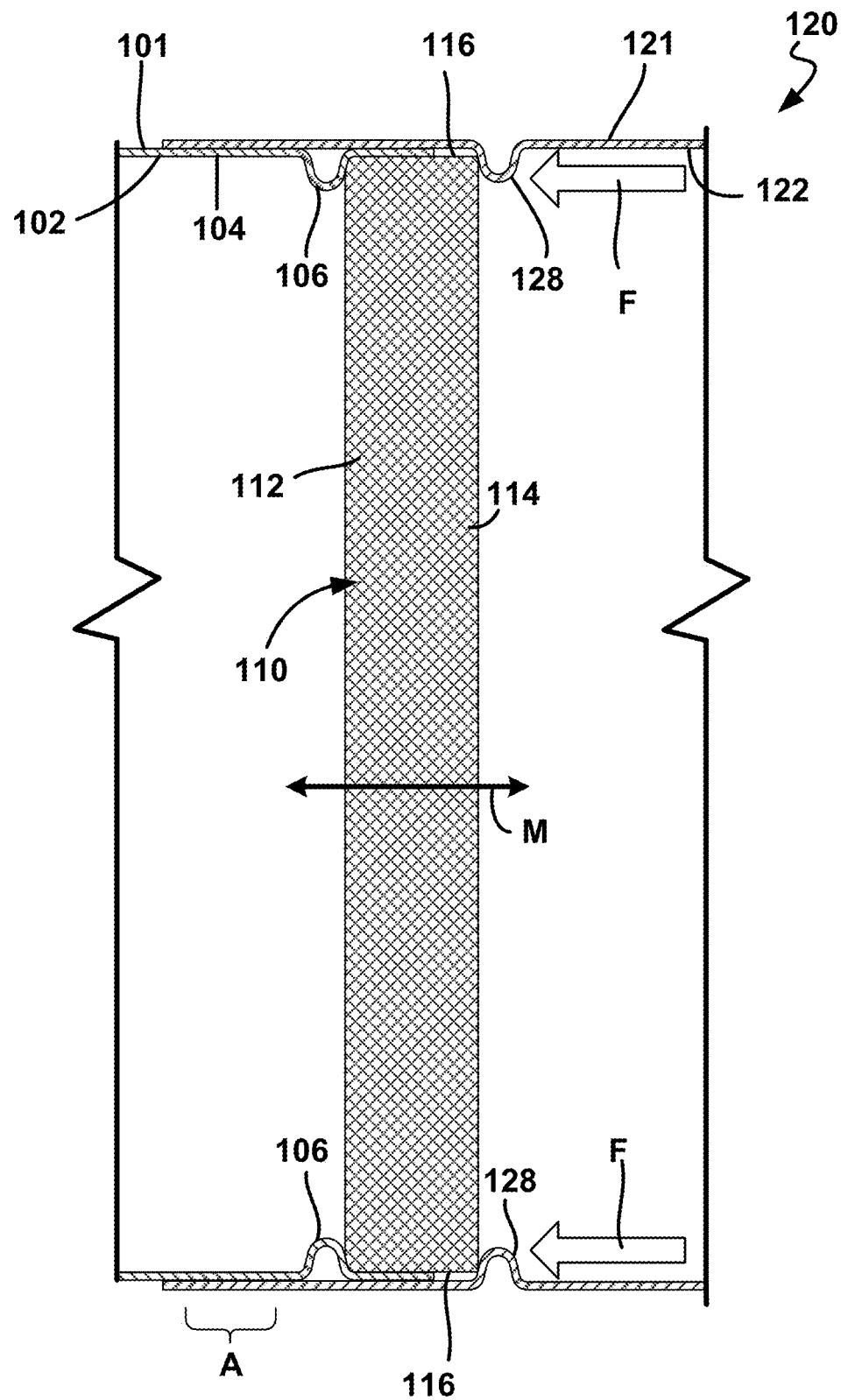
FIG. 2 is a cross-sectional view of a second example retention arrangement holding a mesh puck within a conduit.

FIG. 2 shows a second example retention arrangement 120 for holding a mesh puck 110 within the conduit 102. The mesh puck 110 is installed with the first face 112 abutting a first stop member 106 within the conduit 102. In some implementations, the first stop member 106 is integrally formed with the first pipe 101. In other implementations, the first stop member 106 is separate from the first pipe 101, but pre-installed (e.g., welded, glued, etc.) within the conduit 102 prior to installing the mesh puck 110. An end of a second pipe 121 is mechanically coupled to the first pipe 101 so that the second pipe 121 can slide relative to the first pipe 101. The second pipe 121 defines a second conduit 122 in which a second stop member 128 is disposed. In some implementations, the second stop member 128 is integrally formed with the conduit 122 of the second pipe 121. In other implementations, the second stop member 128 is separate from the second pipe 121, but pre-installed (e.g., welded, glued, etc.) within the conduit 122 prior to coupling the second pipe 121 to the first pipe 101.

The second pipe 121 is moved (e.g., slid) relative to the first pipe 101 until the second stop member 128 presses sufficiently against the second face 114 of the mesh puck 110 to apply a predetermined compression force F to the mesh puck 110 along the mesh axis M. In some examples, the second pipe 121 fits within the conduit 102 of the first pipe 101 and slides along the interiorly facing surface 104 of the first pipe 101. In other examples the second pipe 121 fits over the first pipe 101 and the second stop member 128 slides through one or more slots (or drops into one or more openings) defined in the first pipe 101. The second pipe 121 is then axially fixed (e.g., welded, glued, etc.) relative to the first pipe 101. In certain examples, the second pipe 121 is fixed to the first pipe 101 at a location A spaced from the mesh puck 110, thereby protecting the mesh puck 110 from the securing process (e.g., from heat, contaminants, etc.) compared to when the second stop member 108 is installed within the same pipe 101.

Figure 3:
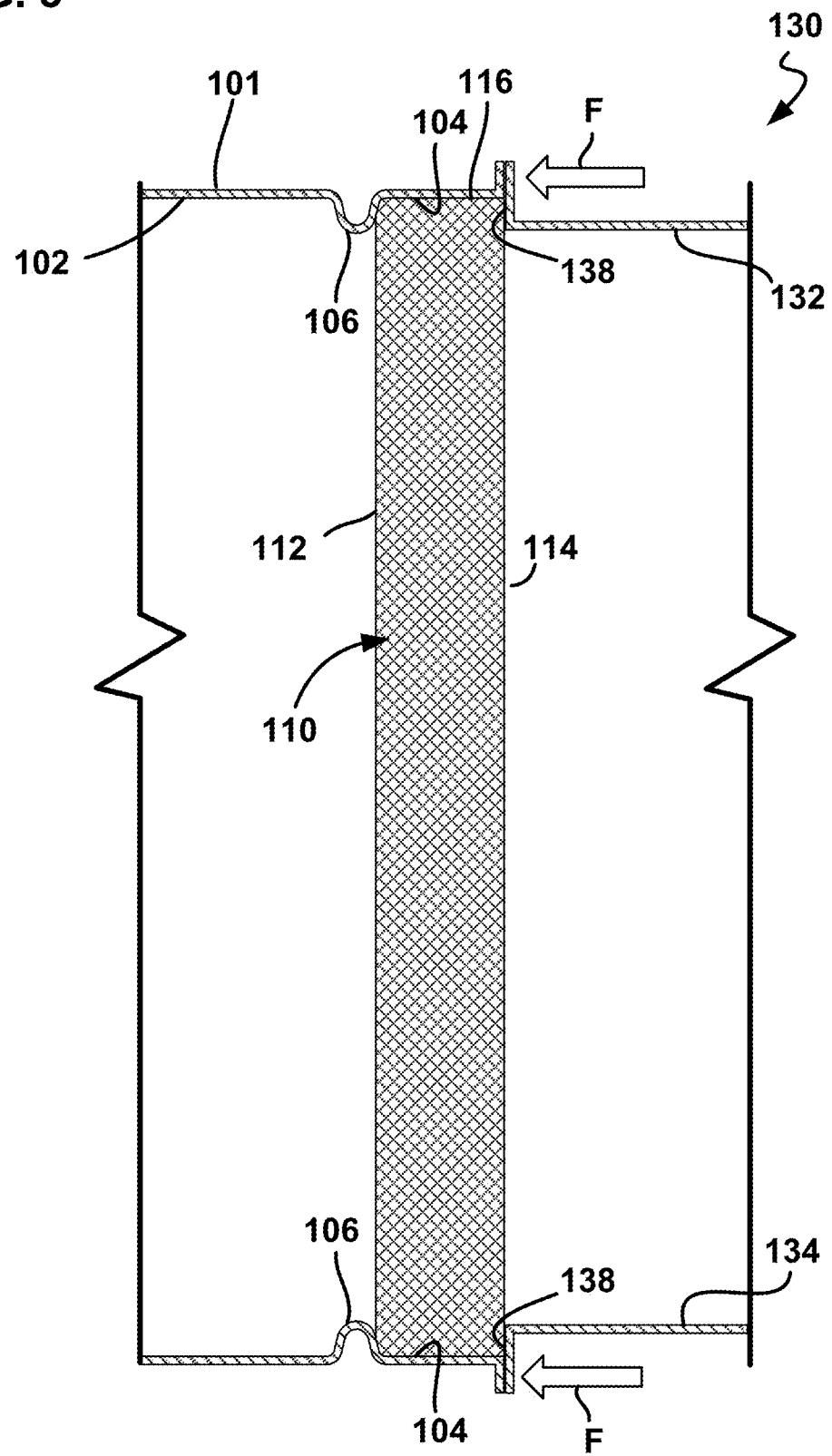
FIG. 3 is a cross-sectional view of a third example retention arrangement holding a mesh puck within a conduit.

FIG. 3 shows a third example retention arrangement 130 for at least axially retaining a mesh puck 110. The mesh puck 110 is installed at an end of a conduit 102 defined by a first pipe 101. The mesh puck 110 is installed with the first face 112 abutting a first stop member 106 within the conduit 102. In the example shown, the first stop member 106 is integrally formed with the first pipe 101 (e.g., by beading, crimping, or dimpling the first pipe 101). In other examples, however, the first stop member 106 may be a separate piece pre-installed within the conduit 102. The first stop member 106 is located such that the mesh puck 110 is disposed at an end of the pipe 101 with the second face 114 facing an exterior of the pipe 101.

A second pipe 131 is aligned with the first pipe 101 so that an end of the second pipe 131 aligns with the second face 114 of the mesh puck 110. The end of the second pipe 131 defines a conduit 132 having a smaller inner cross-dimension (e.g., diameter) than the interiorly facing surface 104 of the conduit 102. A radial shoulder 138 extends outwardly from the conduit 132 at the end of the pipe 131 to define a shoulder facing the conduit 102. The second pipe 131 is moved relative to the first pipe 101 so that the radial shoulder 138 abuts and applies a compression force F to the second face 114 of the mesh puck 110. In FIG. 3, the second pipe 131 has a consistent cross-dimension that is smaller than a cross-dimension of the mesh puck 110. The radial shoulder 138 is defined by a radial flange extending outwardly from the conduit 132.

Figure 4:
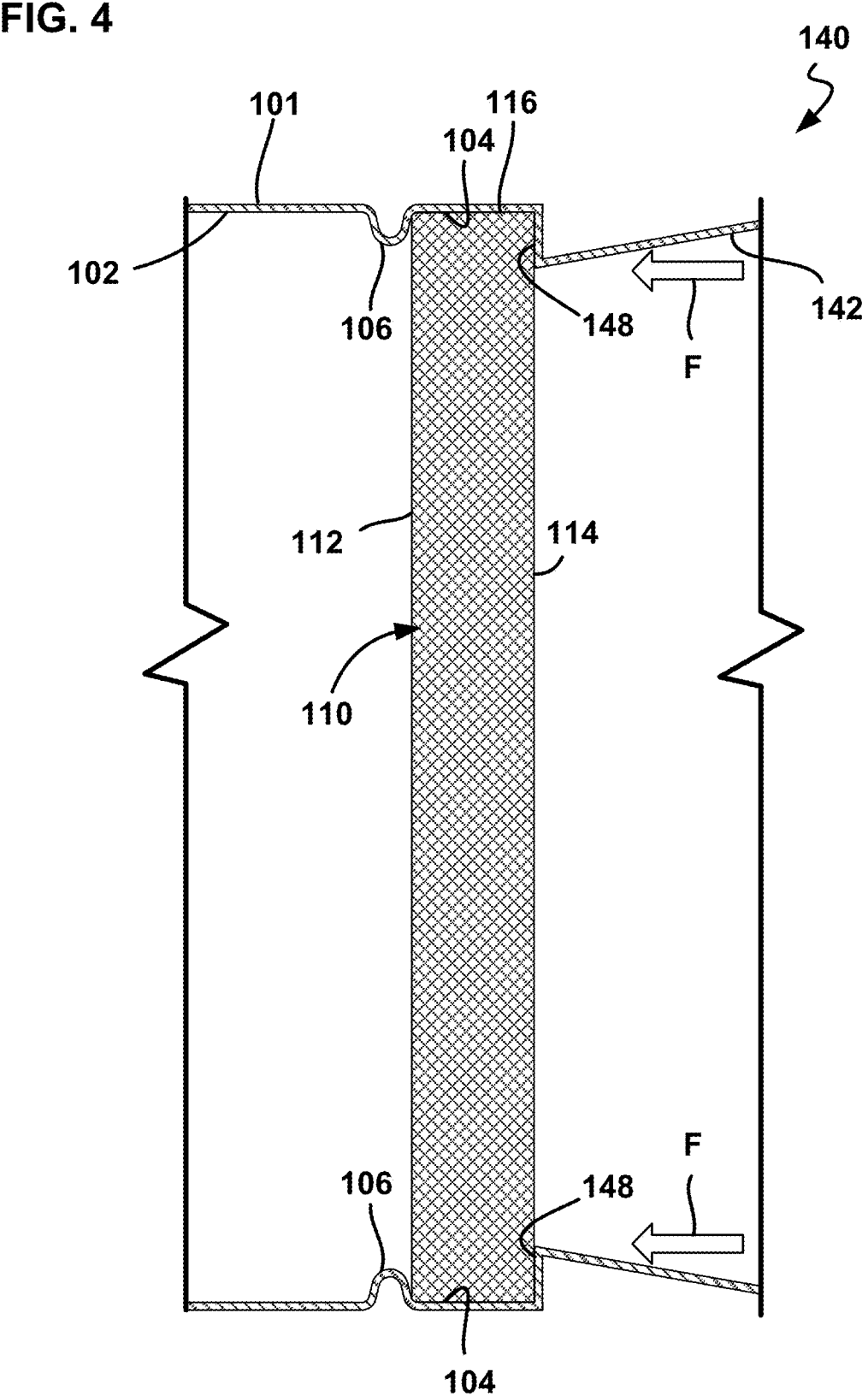
FIG. 4 is a cross-sectional view of a fourth example retention arrangement holding a mesh puck within a conduit.

FIG. 4 shows a fourth example retention arrangement 140 or at least axially retaining a mesh puck 110. A pipe 101 defines a conduit 102 extending axially between first and second ends 141, 143. A first stop member 106 is disposed within the conduit 102 between the first and second ends 141, 143. A second stop member 148 also is disposed within the conduit 102 between the first stop member 106 and the second end 143. The second stop member 148 is spaced downstream from the first stop member 106 by a retention section 145.

The second stop member 148 includes a ramped portion 149 and a shoulder portion 147. The shoulder portion 147 faces the first stop member 106. In some examples, the second stop member 148 is formed by the conduit 102 tapering radially inwardly along a section as the conduit 102 extends from the second end 143 towards the first stop member 106. In other examples, a plurality of second stop members 148 are formed by circumferentially spaced sections of the conduit 102 tapering radially inwardly.

The mesh puck 110 is inserted into the conduit from the second end 143 and moved towards the first stop member 106. As the mesh puck 110 travels along the conduit 102, the puck 110 is radially compressed by the ramped portion(s) 149 of the second stop member(s) 148 until the puck 110 reaches the retention section 145. The puck 110 resiliently expands out into the retention section 145 after clearing the ramped portion(s) 149. The shoulder(s) 147 of the second stop member(s) 148 axially retains the puck 110 within the retention section 145.

In certain implementations, the retention section 145 is sufficiently short that the mesh puck 110 is axially compressed between the first and second stop members 106, 148. A user may need to apply an axial compression load to the mesh puck 110 to dispose the mesh puck 110 fully within the retention section 145. For example, a user may push the mesh puck 110 along the conduit 102 until the first face 112 of the mesh puck 110 abuts the first stop member 106. The user may then continue to push against the second face 114 of the mesh puck 110 until the second face 114 clears the second stop member(s) 148.

Figure 5:
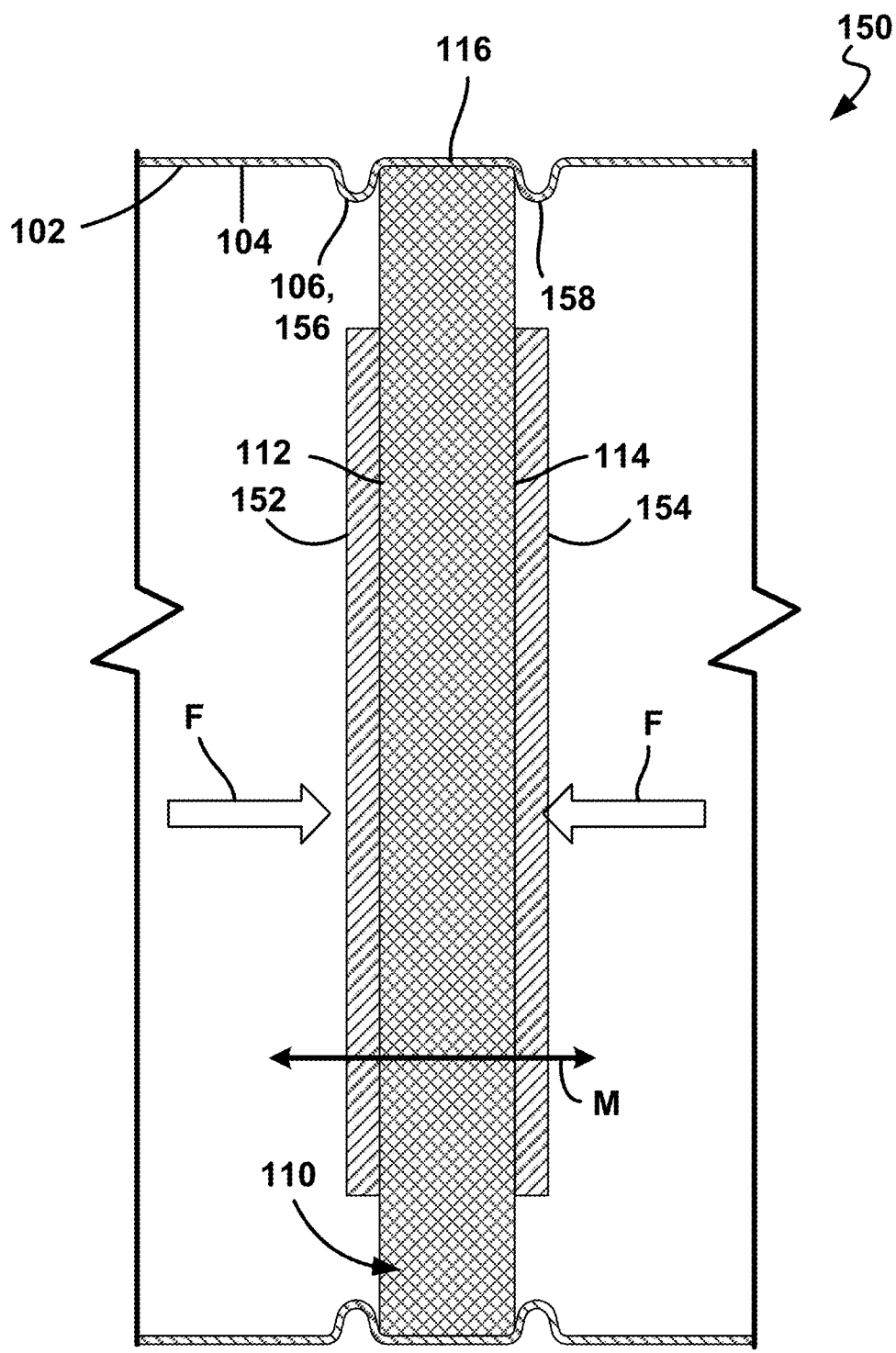
FIG. 5 is a cross-sectional view of a fifth example retention arrangement holding a mesh puck within a conduit.

FIG. 5 illustrates a fifth example retention arrangement 150 for holding a mesh puck 110 within a conduit 102. In certain implementations, the mesh puck 110 is installed within the conduit 102 by sliding the puck 110 in from an end of the pipe 101. In some implementations, the conduit 102 does not initially include any stop members. In other implementations, the conduit 102 initially includes a first stop member 106 (e.g., an integral protrusion, a separately installed piece, a deformation—dimple, crimp, bead—of the pipe, etc.).

An axial compression force F is applied to the mesh puck 110 using one or more compressing members (e.g., pressing plates) 152, 154. In some implementations, the axial compression force F is applied by a first compressing member 152 pushing the mesh puck 110 against the first stop member 106 (if initially included). In other implementations, the axial compression force F is applied by first and second compressing members 152, 154 pushing on the opposite faces 114, 112 of the mesh puck 110 to axially compress the mesh along the mesh axis M. When the mesh puck 110 is suitable compressed (e.g., when a predetermined amount of compression force F is applied to the mesh puck 110), at least the second stop member 158 is added to the conduit 102 at the second face 114 of the mesh puck 110 to retain the mesh puck 110 in the compressed state. In certain examples, both first and second stop members 156, 158 are added to conduit 102 at opposite sides of the mesh puck 110 to retain the mesh puck 110 in the compressed state. For example, one or both stop members 156, 158 are added by beading, dimpling, or crimping the pipe 101. Once the stop members 156, 158 are added, the compressing members 152, 154 can be removed.

Figure 6:
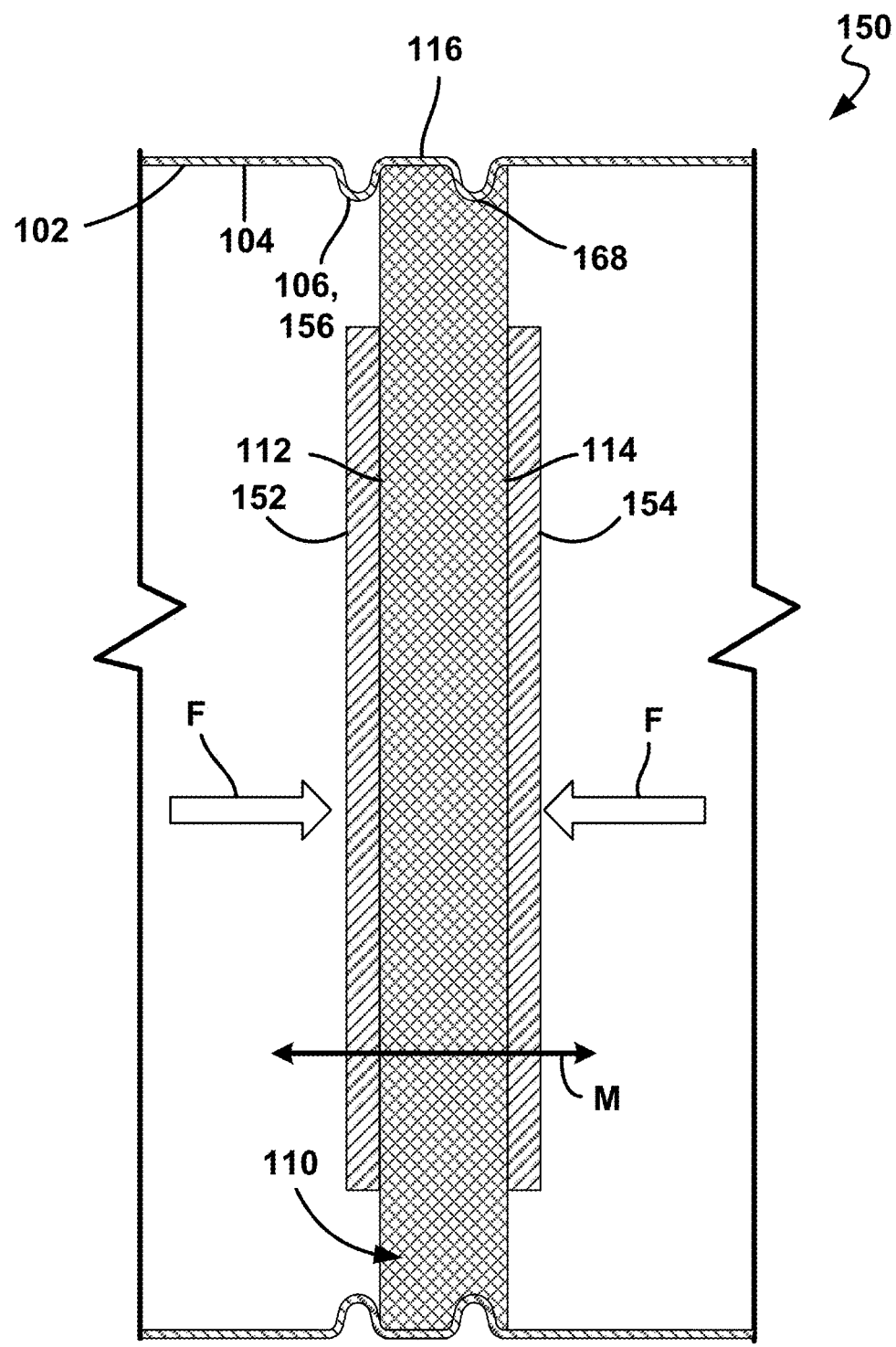
FIG. 6 is a cross-sectional view of a sixth example retention arrangement holding a mesh puck within a conduit.

FIG. 6 illustrates a sixth example retention arrangement 160 for holding a mesh puck 110 within the conduit 102. In certain implementations, the mesh puck 110 is installed within the conduit 102 by sliding the puck 110 in from an end of the pipe 101. The conduit 102 includes a first stop member 106 (e.g., an integral protrusion, a separately installed piece, a deformation—dimple, crimp, bead—of the pipe, etc.) against which the first face 112 of the mesh puck 110 abuts. A predetermined compression force F is applied to the mesh puck 110 (e.g., using compressing plates 152, 154). When the mesh puck 110 is in the compressed state, a second stop member 168 is formed (e.g., by beading, dimpling, crimping, etc.) along the periphery 116 of the mesh puck 110. The second stop member 168 extends into the periphery 116 of the mesh puck 110 instead of along the second face 114 of the mesh puck 110. The second stop member 168 cooperates with the first stop member 106 is maintain the compression force F on at least a portion of the mesh puck 110. For example, the compression force F may be maintained on the portions of the mesh puck 110 disposed between the first and second stop members 106, 168. In still other implementations, the first stop member 106 may extend into the periphery 116 of the mesh puck 110. In such implementations, a middle portion of the mesh puck 110 is maintained in an axially compressed state between the first and second stop members.

Figure 10:
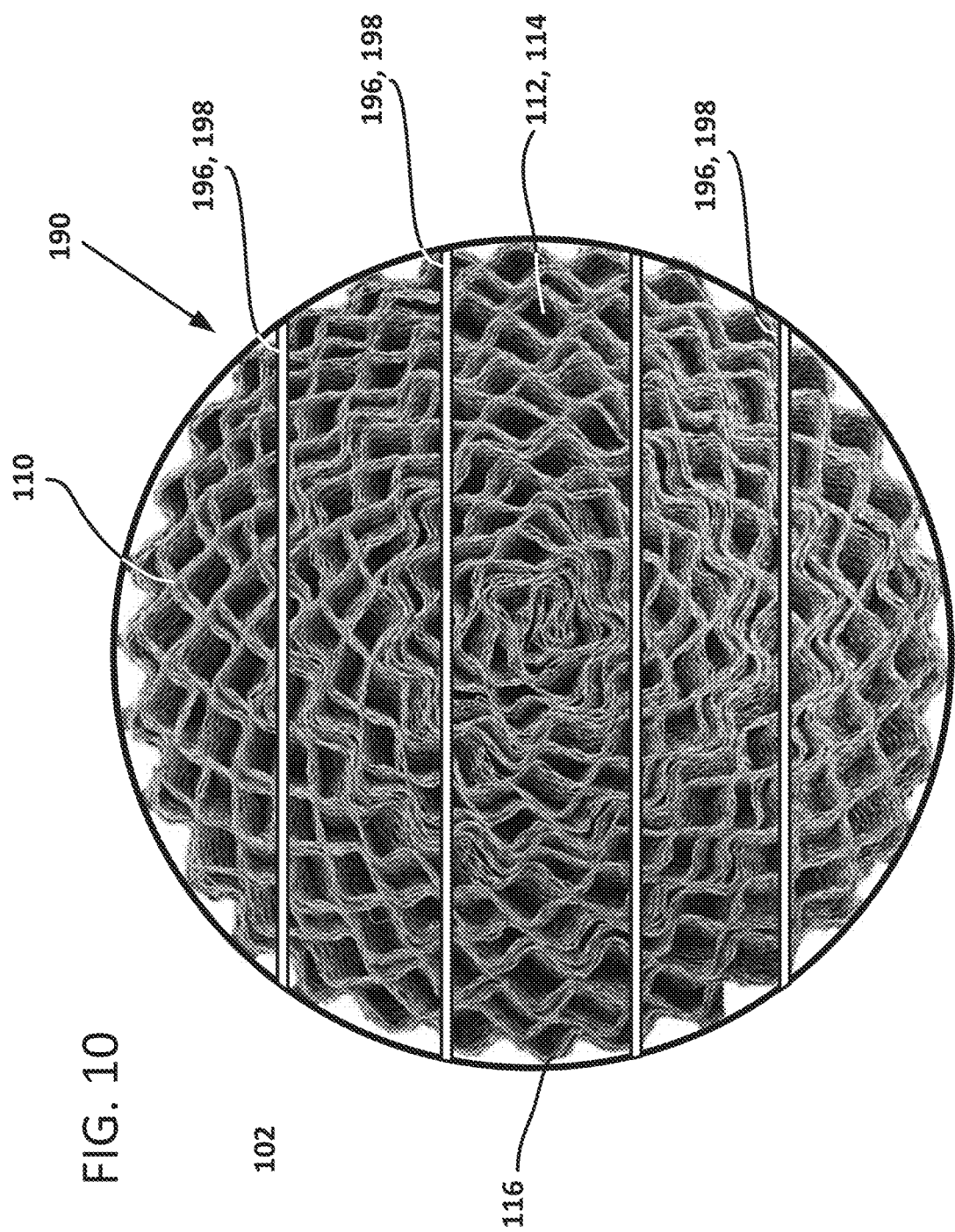
FIG. 10 is a front elevational view of a seventh example retention arrangement holding a mesh puck within a conduit.

FIG. 10 illustrates a seventh example retention arrangement 190 for holding a mesh puck 110 within the conduit 102. In certain implementations, the mesh puck 110 is installed within the conduit 102 by sliding the puck 110 in from an end of the pipe 101. The retention arrangement 190 includes one or more ribs extending across the mesh puck 110 (e.g., across a diameter of the mesh puck or across a chord of the mesh puck) to axially retain the mesh puck 110 within the conduit 102. An outer periphery 116 of the mesh puck 110 is not directly connected to the conduit 102. Rather, the outer peripheral surface 116 of the mesh puck 110 is able to float relative to the conduit 102. In some examples, the ribs are used as second stop members 198 in combination with any of the previously described first stop members 106, 156. In other examples, the ribs are used as first stop members 196 in combination with any of the previously described second stop members 108, 128, 138, 148, 158, 168. In still other examples, the ribs are used as both first stop members 196 and second stop members 198. In yet still other examples, the ribs are disposed at one or both axial end surfaces 112, 114 of the mesh puck 110 in addition to any of the previously described first and second stop members 106, 156, 108, 128, 138, 148, 158, 168. In certain implementations, the ribs 196, 198 cooperate with each other or with other first and/or second stop members) to maintain the mesh puck 110 in the axially compressed state. In certain examples, the ribs have sufficiently small widths and are sufficiently spaced to mitigate blocking exhaust flow through the conduit 102.

In general, the first and second stop members 106, 226, 270, 156, 108, 128, 138, 148, 158, 168, 178, 188, 264 extend radially inwardly from the interiorly facing surface 104 of the conduit 102, 212 (or from an interiorly facing surface of a second conduit 122, 132, 142, 220) by less than the cross-dimension D of the mesh puck 110. In certain implementations, the cross-dimension D of the mesh puck 110 is between about 1 inch and 14 inches. In certain implementations, the cross-dimension D of the mesh puck 110 is between about 2 inch and 12 inches. In certain implementations, the cross-dimension D of the mesh puck 110 is between about 4 inch and 10 inches. In certain examples, the cross-dimension D of the mesh puck 110 is about 4 inches. In certain examples, the cross-dimension D of the mesh puck 110 is about 5 inches. In certain examples, the cross-dimension D of the mesh puck 110 is about 6 inches. In certain examples, the cross-dimension D of the mesh puck 110 is about 7 inches. In certain examples, the cross-dimension D of the mesh puck 110 is about 8 inches.

In some implementations, no portion of the retention arrangement 100, 120, 130, 140, 150, 160, 230, 260 extends across the cross-dimension D or chord of the mesh puck 110. In certain implementations, the first and second stop members 106, 226, 270, 156, 108, 128, 138, 148, 158, 168, 178, 188, 264 extend radially inwardly from the interiorly facing surface 104, 134, 144 of the conduit 102, 132, 142, 212, 220 by less than a tenth of the cross-dimension D of the mesh puck 110. In certain implementations, the first and second stop members 106, 226, 270, 156, 108, 128, 138, 148, 158, 168, 178, 188, 264 extend radially inwardly from the interiorly facing surface 104, 134, 144 of the conduit 102, 132, 142, 212, 220 by between a tenth and a twentieth of the cross-dimension D of the mesh puck 110. In an example, the first and second stop members 106, 226, 270, 156, 108, 128, 138, 148, 158, 168, 178, 188, 264 extend radially inwardly from the interiorly facing surface 104, 134, 144 of the conduit 102, 132, 142, 212, 220 by about $1/8^{th}$ inch. In an example, the first and second stop members 106, 226, 270, 156, 108, 128, 138, 148, 158, 168, 178, 188, 264 extend radially inwardly from the interiorly facing surface 104, 134, 144 of the conduit 102, 132, 142, 212, 220 by about $1/4^{th}$ inch. In other implementations, the first and/or second stop members 106, 226, 270, 156, 108, 128, 138, 148, 158, 168, 178, 188, 264 may extend across the mesh as ribs (e.g., see FIG. 10).

In certain implementations, the first and second stop members 106, 226, 270, 156, 108, 128, 138, 148, 158, 168, 178, 188, 264 cover no more than about 30% of the end faces 112, 114 of the mesh puck 110. In certain implementations, the first and second stop members 106, 226, 270, 156, 108, 128, 138, 148, 158, 168, 178, 188, 264 cover between about 10% to about 30% of the end faces 112, 114 of the mesh puck 110. In certain implementations, the first and second stop members 106, 226, 270, 156, 108, 128, 138, 148, 158, 168, 178, 188, 264 cover no more than about 20% of the end faces 112, 114 of the mesh puck 110.

In certain implementations, one or more additional support members may extend across the mesh puck 110 to aid in axially retaining the mesh puck. For example, one or more rods or beams may extend across the cross-dimension or chord of the conduit 102 along the first and/or second end face 112, 114 of the mesh puck. The ribs have sufficiently small widths and are sufficiently spaced to mitigate blocking exhaust flow through the conduit 102.

In certain implementations, the mesh puck 110 is inhibited from rotating relative to the conduit 102. In some examples, the mesh puck 110 is inhibited from rotating by the axial compression maintained on the mesh puck 110. In other examples, one or more anti-rotation features are disposed within the conduit 102 to maintain a rotational orientation of the mesh puck 110. In certain examples, the anti-rotation feature extends into the peripheral side of the mesh puck 110 without attaching to the mesh puck 110 at a specific point. For example, in some implementations, the anti-rotation feature is not welded or glued to the mesh puck 110. Rather, the mesh puck 110 can move small amounts (e.g., vibrate) relative to the anti-rotation feature during operation of the exhaust aftertreatment device. In other implementations, an anti-rotation tab is secured (e.g., welded or glued) onto the mesh puck 110. The tab is sized to fit into a notch in the conduit 102. However, the tab is not fixedly held in the notch (i.e., is not welded or glued to the notch). In certain examples, an anti-rotation feature includes a dimple (i.e., a dimpled portion of the conduit). In certain examples, the anti-rotation feature is sufficiently small that the anti-rotation feature alone could not cooperate with the first stop member to maintain the mesh puck 110 in the axially compressed state.

Figure 8:
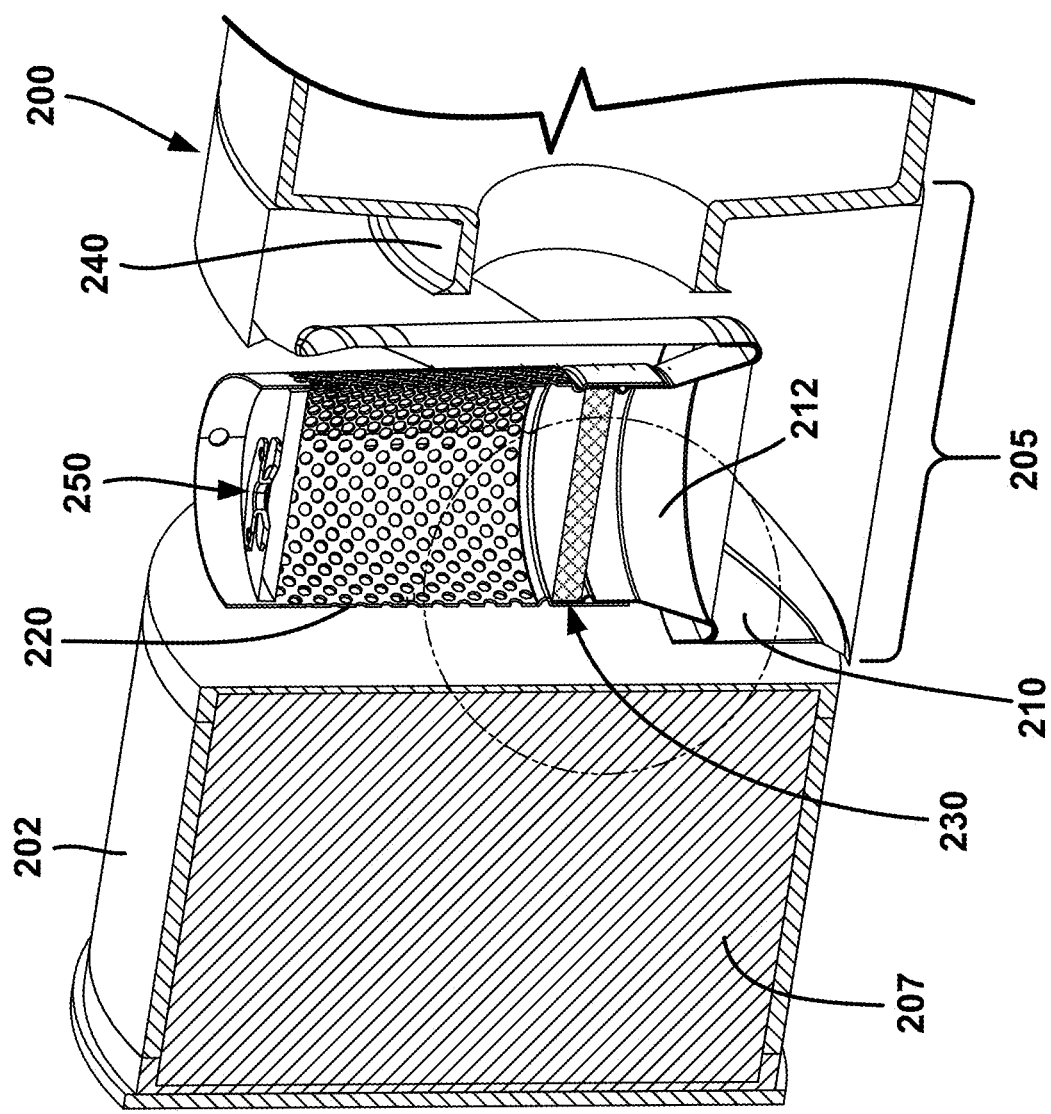
FIG. 8 is a cross-sectional view of an example exhaust treatment device including a dosing and mixing assembly configured to utilize the mesh puck and any of the retention arrangements disclosed herein, the retention arrangement shown including first and second stop members disposed on telescoping pipes.
Figure 9:
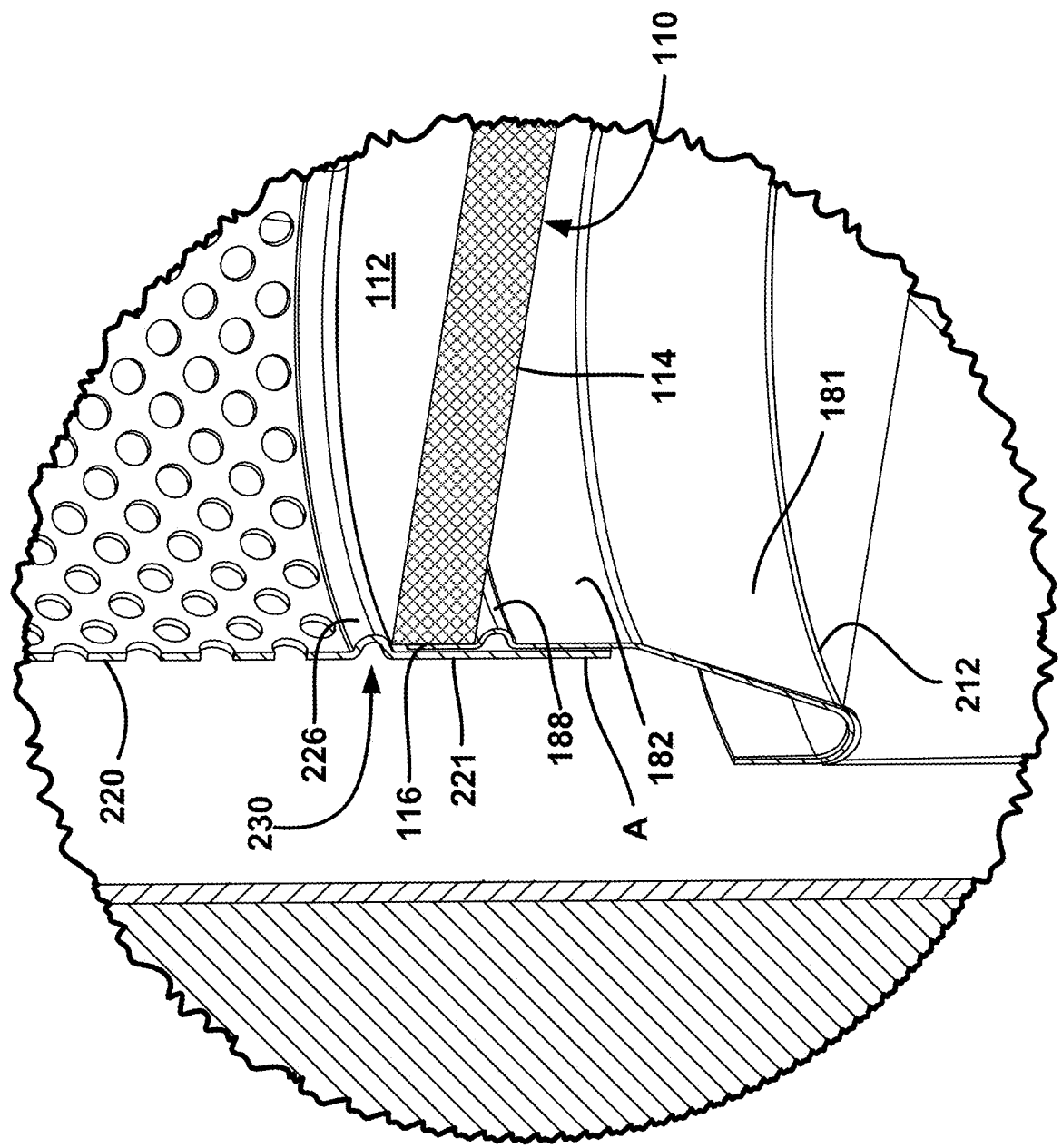
FIG. 9 is an enlarged view of a portion of FIG. 8.

FIGS. 8 and 9 show how the mesh puck 110 and retention arrangement 100, 120, 130, 140, 150, 160, 230, 260 can be used within an example exhaust treatment device 200. The exhaust treatment device 200 includes an exhaust passage 202 through which exhaust flows. A mixing and dosing assembly 205 may be disposed along the exhaust passage 202. In the example shown, the outer housing for the mixing and dosing assembly 205 is hidden for ease in viewing.

A treatment substrate (e.g., a diesel-particulate filter) 207 may be disposed upstream of the mixing and dosing assembly 205. Another treatment substrate (e.g., an SCR substrate) may be disposed downstream of the mixing and dosing assembly 205 (beyond what is shown in FIG. 8). The mesh puck 110 and a corresponding implementation of a retention arrangement 230 may be used in the mixing and dosing assembly 205.

In certain implementations, the mixing and dosing assembly 205 includes a deflection baffle 210 defining a passage 212 through which exhaust passes from upstream of the deflection baffle 210 to downstream of the deflection baffle 210. The mesh puck 110 is disposed at the passage 212 so that the first mesh face 112 faces upstream of the passage 212 and the second mesh face 114 faces downstream of the passage 212. In certain examples, exhaust must pass through the mesh puck 110 to flow past the deflection baffle 210. In certain examples, the deflection baffle passage 212 is positioned and oriented to induce swirling of the exhaust flowing through the passage 212. In certain examples, a restriction baffle 240 is disposed downstream of the deflection baffle 210.

In certain implementations, a perforated conduit (e.g., cylindrical tube, conical tube, frustroconical tube, etc.) 220 is installed upstream of the passage 212. In certain examples, the perforated conduit 220 is aligned with the deflection baffle passage 212. A doser for injecting reactant (e.g., aqueous urea) may be mounted at a doser mounting location 250 at an end of the perforated conduit 220. Example mixing and dosing assemblies 205 suitable for use with the mesh puck 110 and retention arrangements 100, 120, 130, 140, 150, 160, 230, 260 disclosed herein are shown and described in U.S. Pat. No. 10,179,315, the disclosure of which is hereby incorporated herein by reference in its entirety.

In the example shown, the mesh puck 110 can be mounted within a retention arrangement 230 coupled between the deflection baffle 210 and the perforated conduit 220. The retention arrangement 230 includes a first conduit 221 defining a first stop member 226 (e.g., shoulder) against which the first face 112 of the mesh puck 110 abuts. A second conduit 182 defining a second stop member 188 (e.g., shoulder) is pressed into the first conduit until the second shoulder 188 abuts the second face 114 of the mesh puck 110. The first and second shoulders 226, 188 are pressed towards each other until a predetermined compression force is applied to the mesh puck along the mesh axis M. Then, the first and second conduits 221, 182 are secured to each other (e.g., by welding, adhesive, etc.). In other examples, any of the retention arrangements 100, 120, 130, 140, 150, 160, 260 can be utilized with the deflection baffle 210 and perforated conduit 220.

In some implementations, the first conduit 221 attaches to the perforated conduit 220. In other implementations, the first conduit 221 is integral with the perforated conduit 220. In certain implementations, the second conduit 182 attaches to the deflection baffle 210. In other implementations, the first and/or second conduits 221, 182 may attach to intervening structure between the perforated conduit 220 and the deflection baffle 210. In the example shown, the second conduit 182 is integral with a frustroconically-shaped conduit 181, which attaches to the deflection baffle 210. In other examples, the second conduit 182 may mechanically attach to a frustroconically-shaped conduit.

In certain implementations, the mesh puck 110 is sized (e.g., the wire diameter and mesh density are sized) to inhibit unhydrolized/unvaporized reductant from passing through the mesh puck 110. For example, the unhydrolized/unvaporized reductant may impinge on the mesh puck 110 and break into smaller droplets prior to reaching an impact plate or the surrounding housing or entering the restriction baffle 240 downstream of the mesh puck 110. Breaking the droplets both decreases the size of and increases the number (and hence total surface area) of the droplets. The smaller size and increased surface area promotes evaporation of the droplets.

In certain implementations, the mesh puck 110 absorbs heat from the exhaust passing therethrough. The mesh puck 110 may pass some of the absorbed heat to the impinging droplets of reductant injected by the doser, which enhances evaporation of the droplets and/or inhibits deposition of the droplets on the body 205 and impaction plate. Droplets that impinge on the mesh puck 110 reside within the exhaust flow while disposed on the mesh puck 110, which enhances evaporation of the droplets. In certain implementations, the mesh puck 110 heats up faster than a solid surface would, especially during transient exhaust conditions.

Figure 11:
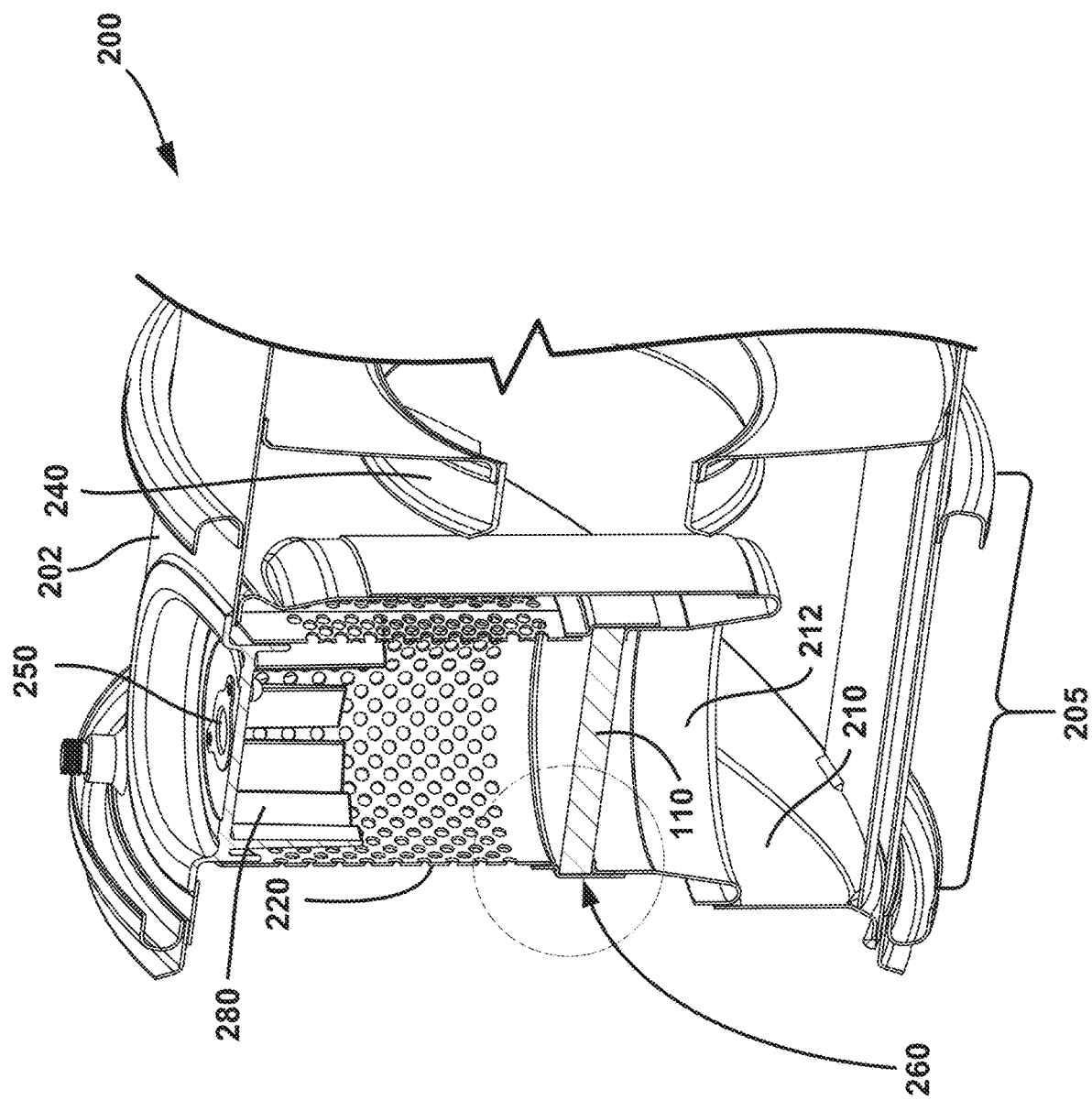
FIG. 11 is a cross-sectional view of an example exhaust treatment device including a dosing and mixing assembly configured to utilize the mesh puck and any of the retention arrangements disclosed herein, the retention arrangement shown including first and second stop members disposed on telescoping pipes.
Figure 12:
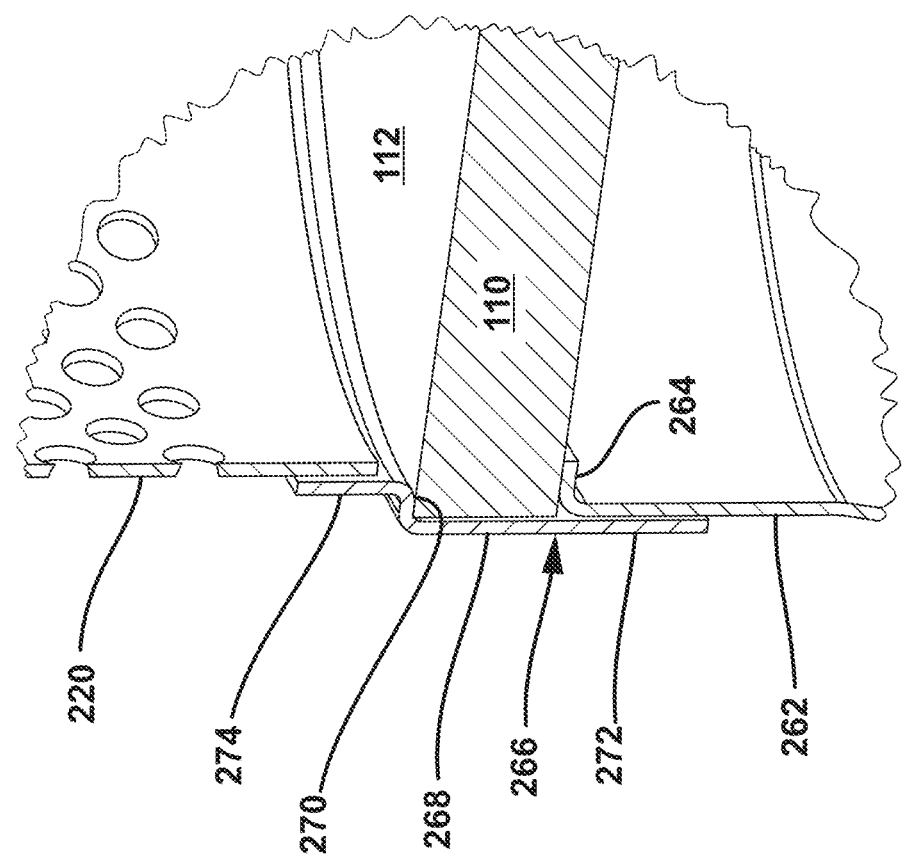
FIG. 12 is an enlarged view of a portion of FIG. 11.

FIGS. 11 and 12 illustrate another retention arrangement 260 for holding the mesh puck 110 within the example exhaust treatment device 200 of FIG. 8. In the example shown in FIG. 11, the portions of the conduit 202 upstream of the mixing and dosing assembly 205 are hidden for ease in viewing. A treatment substrate (e.g., a diesel-particulate filter) 207 may be disposed upstream of the mixing and dosing assembly 205 (e.g., see FIG. 8). Another treatment substrate (e.g., an SCR substrate) may be disposed downstream of the mixing and dosing assembly 205 (beyond what is shown in FIG. 10). The retention arrangement 260 is shown holding the mesh puck 110 in the passage 212 downstream of the deflection baffle 210.

The mesh puck 110 is disposed at the passage 212 so that the first mesh face 112 faces upstream of the passage 212 and the second mesh face 114 faces downstream of the passage 212. In certain examples, the deflection baffle passage 212 is positioned and oriented to induce swirling of the exhaust flowing through the passage 212. In certain examples, a restriction baffle 240 is disposed downstream of the deflection baffle 210. In certain implementations, the perforated conduit 220 is installed upstream of the passage 212 in alignment with the deflection baffle passage 212. The doser mounting location 250 is disposed at an end of the perforated conduit 220.

Details of example mixing and dosing assemblies 205 suitable for use with the mesh puck 110 and retention arrangements 260 disclosed herein are shown and described in U.S. Pat. No. 10,179,315, the disclosure of which is hereby incorporated herein by reference in its entirety.

In the example shown, the mesh puck 110 can be mounted within a retention arrangement 260 coupled between the deflection baffle 210 and the perforated conduit 220. The retention arrangement 260 includes a first conduit 262 defining a first stop member 264 (e.g., a shelf) on which the second face 114 of the mesh puck 110 seats. A cowl 266 fits over the mesh puck 110 and first conduit 262. The cowl 266 defines a second stop member 270 (e.g., a shoulder) that cooperates with the shelf 264 to axially compress the mesh puck 110 therebetween along the mesh axis M. In certain examples, the shoulder 270 and shelf 264 extend over an outer peripheral area of the end faces 112, 114 of the mesh puck 110, leaving a majority of each end face 112, 114 exposed to flow passing through the perforated conduit 220.

In certain implementations, a first axial end of the first conduit 262 mechanically attaches (e.g., by welding, adhesive, or friction-fit) to the deflection baffle 210 while an opposite second axial end defines the shelf 264. In certain examples, the first axial end has a frustroconical shape. In certain examples, the second end has a cylindrical shape. In certain examples, the first axial end of the first conduit 262 has a transverse cross-sectional area that is larger than the transverse cross-sectional area of the second axial end. In certain examples, the transverse cross-sectional area of the second axial end is larger than a transverse cross-sectional area of the perforated conduit 220.

The cowl 266 fits telescopingly over the first conduit 262 to enable adjustment of the amount of compressive force applied to the mesh puck 110. An inner surface 268 of the cowl 266 extends over the periphery 116 of the mesh puck 110 without attaching thereto. Accordingly, the periphery 116 of the mesh puck 110 floats relative to the inner surface 268 of the cowl 266. Sliding the cowling 266 so that the shoulder 270 moves closer to the shelf 264 increases the compressive pressure applied to the puck 110. Sliding the shoulder 270 away from the shelf 264 reduces the compressive pressure on the puck 110. When the desired amount of compressive force is applied to the mesh puck 110, the cowling 266 is fixed (e.g., by welding or adhesive) to the first conduit 262 at a securement region 272. In certain implementations, the securement region 272 is offset from the inner surface 268 facing the peripheral edge 116 of the puck 110. Accordingly, heat from welding the cowl 266 to the conduit 262 does not burn the wires or melt the braise of the mesh puck 110.

In some implementations, the cowl 266 includes a mounting section 274 for coupling to the perforated conduit 220. For examples, the perforated conduit can be telescopingly fit within an axial end of the cowl 266 and secured (e.g., by welding or adhesive) thereto. In certain examples, the mounting section 274 is recessed radially inward compared to the inner surface 268 opposing the mesh puck 110. In certain examples, the shoulder 270 provides a radial transition between the inner surface 268 and the mounting section 274. In other implementations, the cowl 266 is integrally formed with the perforated conduit 220.

In certain implementations, flow guides 280 may be disposed within the perforated conduit 220 (e.g., at the doser tip). In certain examples, the flow guides 280 may inhibit exhaust from depositing on or around the doser tip. In certain examples, the flow guides 280 may generate turbulence (e.g., swirling) local to the doser mounting location 250 to mitigate such deposits. Examples of suitable flow guides 280 are provided in U.S. Provisional Application No. 62/872,780, filed Jul. 11, 2019, and titled "Dosing Conduit Arrangement for Exhaust Aftertreatment Systems," the disclosure of which is hereby incorporated herein by reference in its entirety.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A mixer assembly for an exhaust flow conduit having a longitudinal axis, the mixer assembly comprising:
   a doser boss mounted to the exhaust flow conduit;
   a mixer arrangement disposed within the exhaust flow conduit, the mixer arrangement including a deflection body defining a deflection passage and a perforated conduit coupled to the deflection body upstream of the deflection passage, the perforated conduit extending along a conduit axis that is aligned with the doser boss and with the deflection passage; and
   a mesh arrangement disposed at the deflection passage, the mesh arrangement including a mesh puck and a retaining arrangement that maintains the mesh puck in an axially compressed state, the mesh puck being compressed along a mesh axis when in the axially compressed state, the mesh axis being coaxial with the conduit axis,
   wherein the retaining arrangement maintains a compression force of at least 50 pound-force.

2. The mixer assembly of claim 1, wherein the mesh axis is angled relative to the longitudinal axis of the exhaust flow conduit.

3. An exhaust treatment device comprising:
   a conduit extending along a longitudinal axis and defining an interiorly-facing surface;
   a retaining arrangement disposed along the conduit, the retaining arrangement including a first stop member and a second stop member; and
   a mesh puck disposed within the retaining arrangement, the mesh puck including opposite first and second axial ends separated along a thickness of the mesh puck by an outwardly-facing peripheral side, the first axial end abutting the first stop member and the outwardly-facing peripheral side facing the interiorly-facing surface of the conduit;
   the first and second stop members being spaced to hold at least a majority of the thickness of the mesh puck therebetween, the first and second stop members holding the mesh puck while allowing the outwardly-facing peripheral side of the mesh puck to float relative to the interiorly facing surface of the conduit, wherein a majority of the first and second axial ends of the mesh puck remain exposed to a passage;
   wherein the conduit defines a first conduit and a second conduit joined together, wherein the first stop member is part of the first conduit and the second stop member is part of the second conduit, and
   wherein the mesh puck is axially compressed by the first and second stop members by an axial compression distance of at least 0.01 inches.

4. The exhaust treatment device of claim 3, wherein the conduit has an upstream perforated section and a downstream non-perforated section; and wherein the mesh puck is disposed downstream of the perforated section.

5. The exhaust treatment device of claim 4, wherein the perforated section is a separate piece from the non-perforated section.

6. The exhaust treatment device of claim 5, wherein the perforated section forms one of the first and second stop members and the non-perforated section forms the other of the first and second stop members.

7. The exhaust treatment device of claim 5, wherein at least one of the first and second stop members is defined by a third piece that mounts at a junction of the perforated section and the non-perforated section.

8. The exhaust treatment device of claim 3, wherein the conduit forms part of a mixer arrangement and is aligned with a doser boss within a pipe of an exhaust treatment system.

9. The mesh retention assembly of claim 8, wherein the mixer arrangement includes a deflection body defining a deflection passage and a perforated conduit coupled to the deflection body upstream of the deflection passage, the perforated conduit extending along a conduit axis that is aligned with the doser boss and with the deflection passage; and wherein the mesh puck is disposed at the deflection passage.

10. The mesh retention assembly of claim 3, wherein one of the first and second stop members is a shoulder.

11. The mesh retention assembly of claim 3, wherein the second stop member defines a ramped section and a shoulder, the shoulder facing the first stop member.

12. The mesh retention assembly of claim 3, wherein the first and second stop members are integral with the conduit.

13. The mesh retention assembly of claim 3, wherein at least one of the first and second stop members is a separate piece from the conduit.

14. The mesh retention assembly of claim 3, wherein the second axial end of the mesh puck abuts the second stop member.

15. The mesh retention assembly of claim 3, wherein the second stop member extends into the peripheral side of the mesh puck.

16. The mesh retention assembly of claim 3, wherein the first and second stop members inhibit rotation of the mesh puck relative to the conduit.

17. The mesh retention assembly of claim 3, wherein the mesh puck is mantle-less.

18. The mesh retention assembly of claim 3, wherein the first stop member is one of a plurality of first stop members disposed in a first circumferential ring about the interiorly-facing surface of the conduit; and wherein the second stop member is one of a plurality of second stop members disposed in a second circumferential ring about the interiorly-facing surface of the conduit.

19. The mesh retention assembly of claim 3, wherein the first and second stop members each form a continuous circumferential ring about the interiorly-facing surface of the conduit.

20. The mesh retention assembly of claim 3, wherein the first and second stop members extend radially inwardly from the interiorly facing surface of the conduit by less than a cross-dimension of the mesh puck.

21. The mesh retention assembly of claim 3, wherein no portion of the retaining arrangement extends fully across a cross-dimension of the mesh puck.

22. The mesh retention assembly of claim 3, wherein the mesh puck is axially compressed by the first and second stop members by an axial compression force of at least 20 pound-force.

23. An exhaust treatment device comprising:
- a conduit extending along a longitudinal axis and defining an interiorly-facing surface;
- a retaining arrangement disposed along the conduit, the retaining arrangement including a first stop member and a second stop member; and
- a mesh puck disposed within the retaining arrangement, the mesh puck including opposite first and second axial ends separated along a thickness of the mesh puck by an outwardly-facing peripheral side, the first axial end abutting the first stop member and the outwardly-facing peripheral side facing the interiorly-facing surface of the conduit;
- the first and second stop members being spaced to hold at least a majority of the thickness of the mesh puck therebetween, the first and second stop members holding the mesh puck while allowing the outwardly-facing peripheral side of the mesh puck to float relative to the interiorly facing surface of the conduit, wherein a majority of the first and second axial ends of the mesh puck remain exposed to a passage;
- wherein the conduit defines a first conduit and a second conduit joined together, wherein the first stop member is part of the first conduit and the second stop member is part of the second conduit, wherein the mesh puck is axially compressed by the first and second stop members by an axial compression force of at least 20 pound-force.

* * * * *